April 23, 1968
A. C. HARRILL
3,379,119
BARBECUE ROTISSERIE
Filed April 6, 1966
2 Sheets-Sheet 1
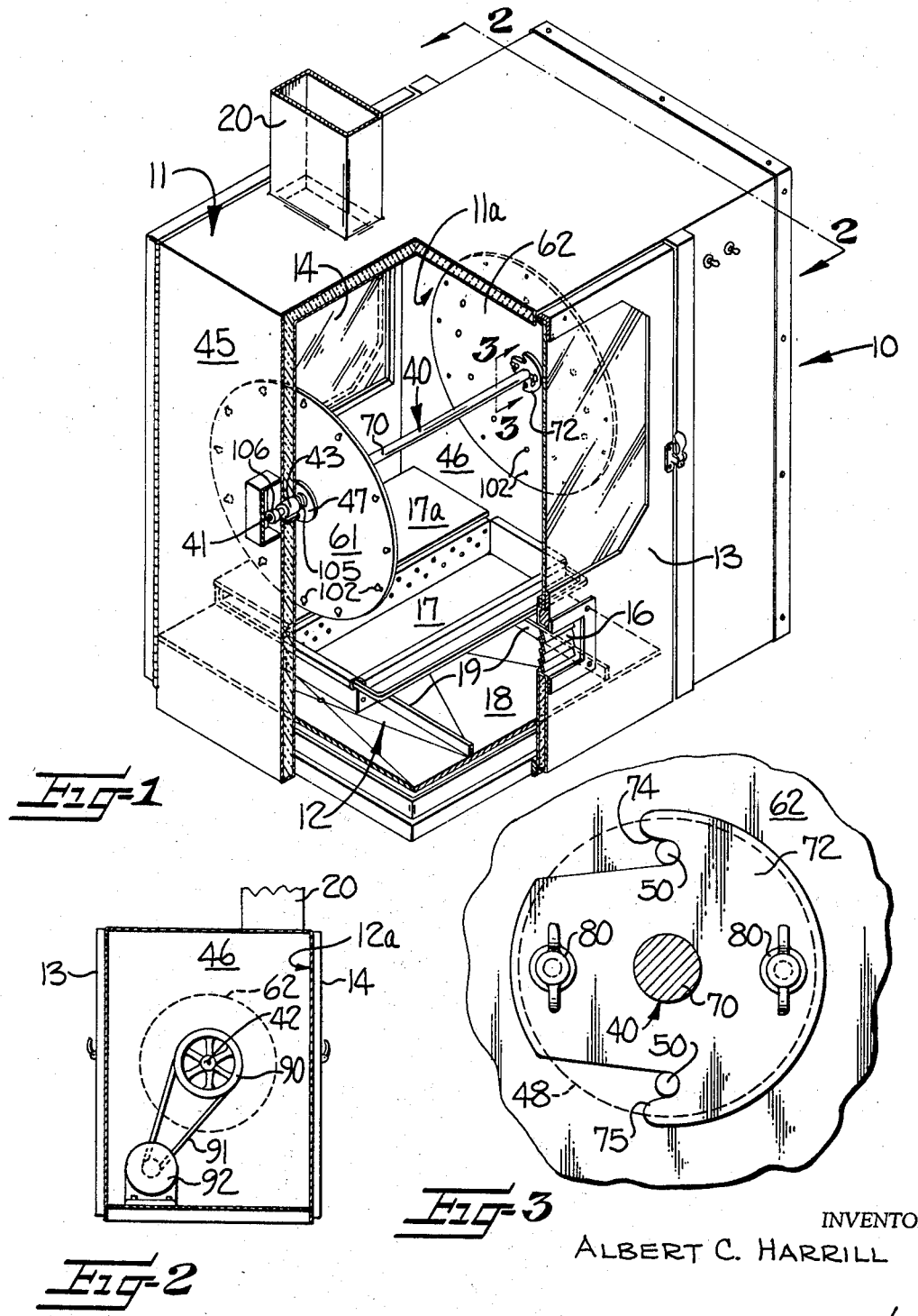
INVENTOR:
ALBERT C. HARRILL
BY Parrott, Bell, Seltzer, Park & Heard
ATTORNEYS April 23, 1968   A. C. HARRILL   3,379,119
BARBECUE ROTISSERIE
Filed April 6, 1966   2 Sheets-Sheet 2
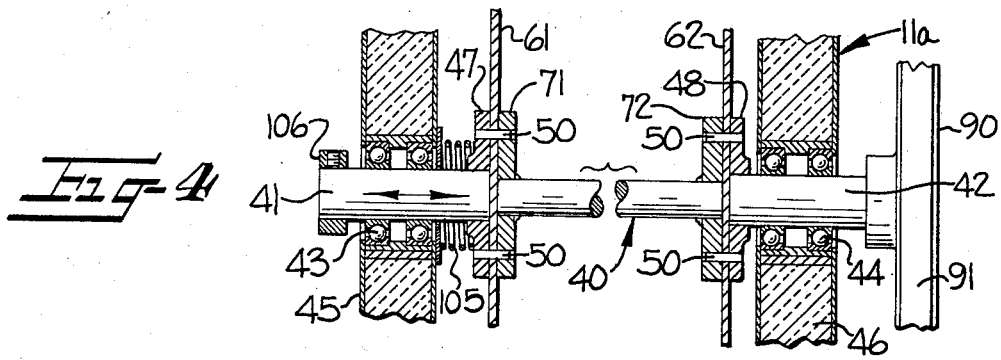
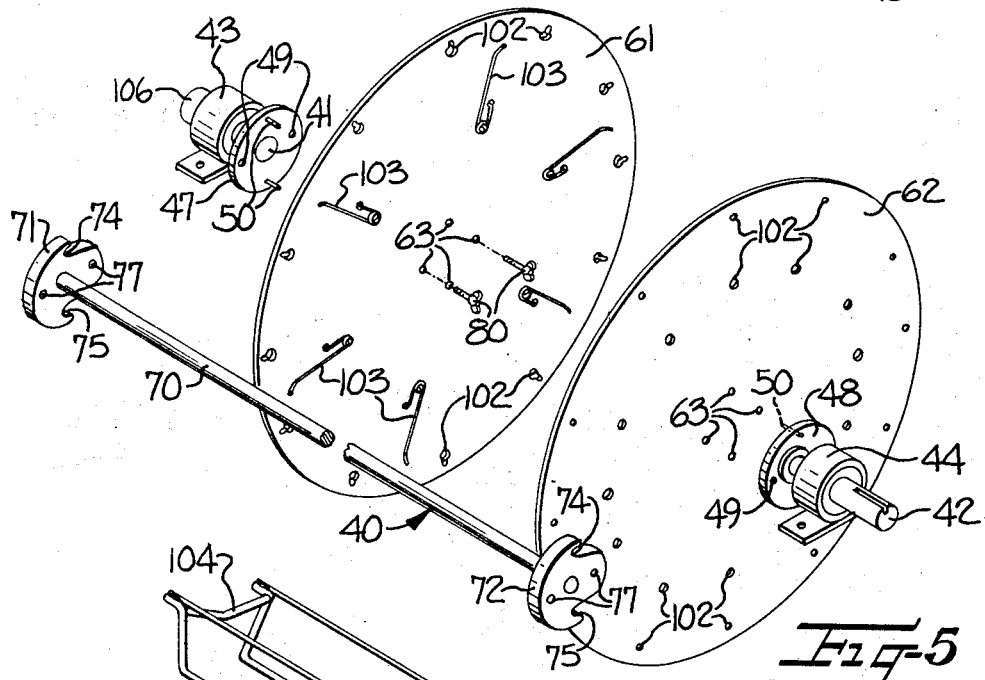
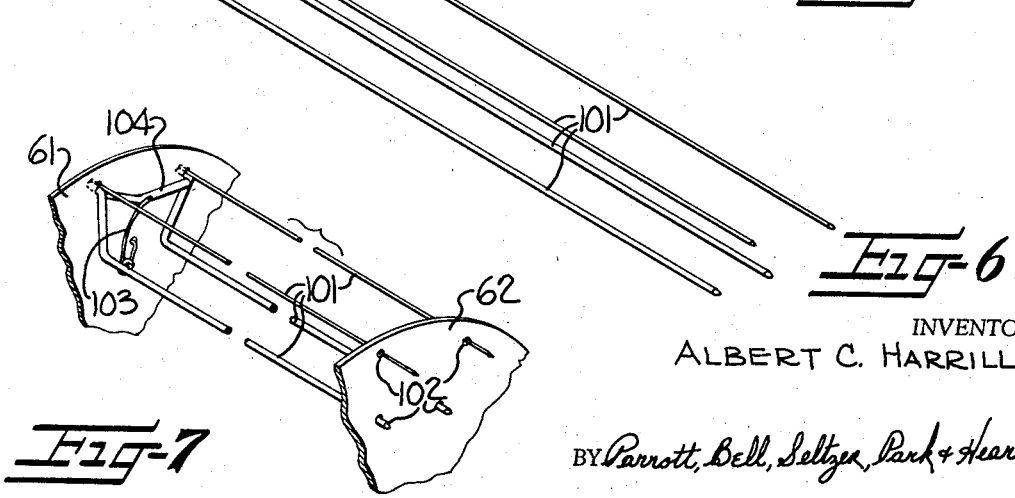
INVENTOR:
ALBERT C. HARRILL
BY Parrott, Bell, Seltzer, Park & Heard
ATTORNEYS

United States Patent Office 3,379,119
Patented Apr. 23, 1968

3,379,119
BARBECUE ROTISSERIE
Albert C. Harrill, 2710 Mayflower Road,
Charlotte, N.C. 28208
Filed Apr. 6, 1966, Ser. No. 540,658
2 Claims. (Cl. 99—421)

ABSTRACT OF THE DISCLOSURE

A barbecue device having a housing and a rotisserie comprising first and second spaced apart axially aligned stub shafts rotatably mounted in the housing, a central shaft positioned between the stub shafts, a pair of spit supporting discs positioned adjacent each end of the central shaft and the end of the associated stub shaft, and including means permitting removal of the central shaft and the discs from the stub shafts without disturbing the positional arrangement of the stub shafts.

---

This invention relates to barbecue machines and more particularly to barbecue machines utilizing a rotisserie for supporting and moving food products during the cooking thereof.

Commercial barbecue machines are usually comprised of a housing enclosing a suitably ventilated oven compartment having a rotisserie centrally located therein. The rotisserie is generally composed of a central shaft which carries a pair of circular plates or discs in spaced relation thereon. The discs are mounted for rotation with the shaft and circumferentially support a plurality of food spits therebetween. The shaft is rotatably mounted in support bearings in the walls of the housing and is externally driven by drive means operatively attached to the shaft and located outside the oven compartment. The shaft is rotated to alternately position the spits adjacent a heat source located in the oven compartment so that the food on the rotisserie is evenly cooked.

In operation of such a barbecue machine, food juices, grease, and particles quickly accumulate on the various parts of the rotisserie and housing. To effectively clean the rotisserie, it must be removed from the oven compartment by disconnecting the shaft of the rotisserie from its drive means, loosening the end discs thereon, and axially withdrawing the shaft from the spaced discs and the support bearings in the housing walls. Due to the size and weight of the rotisserie parts and the attachment of the shaft to the bearings and the drive means, removal of the rotisserie is time consuming and difficult.

It is an object of the present invention to provide a novel rotisserie for barbecue machines which can be quickly and easily removed from the oven compartment for cleaning.

It is a more specific object of the invention to provide a barbecue rotisserie having a removable central shaft connected to a pair of journaled stub shafts with the spit supporting end plates or discs retained therebetween to permit removal of the discs from the oven compartment without disturbing the stub shafts or disconnecting the drive connections to the rotisserie.

Some of the objects of the invention having been stated, other objects will appear as the description proceeds, when taken in connection with the accompanying drawings, in which—

FIGURE 1 is a perspective view of a barbecue machine with a portion cut away to show the novel rotisserie of the present invention incorporated therein;

FIGURE 2 is a cross-sectional view of the barbecue machine seen in FIGURE 1 taken along the line 2—2 thereof;

FIGURE 3 is a partial cross-sectional view with parts broken away, of the central shaft of the rotisserie taken along line 3—3 of FIGURE 1;

FIGURE 4 is a partial cross-sectional view, with parts broken away, of the rotisserie seen in FIGURE 1 showing the manner in which the rotisserie is secured to the housing of the barbecue machine;

FIGURE 5 is an exploded perspective view of the rotisserie of the present invention;

FIGURE 6 is a perspective view of one of the food support spits used to retain food; and FIGURE 7 is a perspective view of the spit seen in FIGURE 6 shown mounted between the end plates or discs of the rotisserie, with parts of the discs broken away for convenience.

Referring now to the drawings, FIGURE 1 shows a commercial barbecue machine 10 having an enclosure housing 11, which is divided by a cross-wall 11a into an oven compartment 12 and motor compartment 12a (FIGURE 2). The oven compartment 12 has front and back doors 13 and 14, each of which has an air vent or louver in the lower portion of the door. One of the louvers 16 is shown. A firebox 17 is supported in spaced relation to the floor 18 of the housing by raised runners 19 and has an adjustable cover 17a supported thereon. Food odors and smoke are effectively removed from the oven compartment by an exhaust chimney 20 which extends from the top portion of the oven compartment. Disposed above the firebox 17 and located centrally within the oven compartment 12 is a rotisserie, generally indicated at 40, which incorporates the novel features of the present invention.

The rotisserie 40 includes a pair of stub shafts 41 and 42 rotatably supported in journal bearings 43 and 44 which are mounted in respective opposed end walls 45 and 46 of the oven compartment (FIGURE 4) and positioned so that the stub shafts 41 and 42 are axially aligned. On the inner ends of stub shafts 41 and 42 are mounted hubs 47 and 48, each of which has a pair of apertures 49 and a pair of projections 50 circumferentially spaced about the hub (FIGURE 5). The projections 50 extend inwardly from the inner faces of the stub shaft hubs. A pair of spit supporting discs 61 and 62 are disposed substantially perpendicular to the axis of the stub shafts and have centrally disposed apertures 63 therein which are in alignment with the apertures 49 and projections 50 on the stub shaft hubs. The projections 50 on each of the hubs extend through corresponding apertures on each of the discs to support the discs 61 and 62 on the stub shafts 41 and 42, respectively. Projections 50 are of sufficient length to extend beyond the inner faces of the discs 61 and 62.

A removable central shaft 70 extends between and is axially aligned with the stub shafts 41 and 42 and has a pair of end hubs 71 and 72 thereon which abut the inner faces of discs 61 and 62, respectively. End hubs 71 and 72 are identical and each has a pair of lateral grooves 74 and 75 which slidably engage the projections 50 extending through the apertures 63 of the discs. Each of the hubs 71 and 72 also has an aperture 77 which coincides with the aligned apertures 63 and 49 in each of the associated discs and stub shaft hubs, respectively. A pair of wing bolts 80 extend through the apertures 77 and 63 of each central shaft hub and disc and are threadably secured in the aperture 49 in each stub shaft hub to secure the central shaft and discs to the journaled stub shafts.

Attached to the end of stub shaft 42 is a pulley 90 which is connected by a flexible drive element 91 to a motor 92 located in the motor compartment 12a of the barbecue machine (FIGURE 2). Motor 92 rotates the stub shaft 42 and the hub connections and central shaft 70 transmits the rotation to the stub shaft 41.

Discs 61 and 62 support a plurality of food spits therebetween. The food spits (FIGURE 6) consist of four spaced parallel rods 101 which are integrally connected at one end and have sharpened opposite ends to receive food portions impaled thereon. The end portions of the spits extend through a plurality of holes 102 which are spaced about the outer portion of each disc (FIGURE 7) and the spits are retained in the holes 102 by spring devices 103 which frictionally engage a cross-element 104 on the connected end of the spits to secure the spits to the discs 61 and 62.

To disassemble the rotisserie for cleaning, the spits are removed from the end discs 61 and 62, wing bolts 80 are removed from their respective apertures in the hubs, and the central shaft 70 slidably moved in a direction parallel to the faces of the discs 61, 62 to disengage the central shaft hubs from the projections 50 on the stub shaft hubs. When the central shaft 70 is clear of the discs, each disc is manually removed from the supporting projections on its associated stub shaft hub by displacing it inwardly to clear the projections.

To reassemble the rotisserie after the oven compartment and rotisserie parts have been cleaned, the discs 61 and 62 are placed on the projections 50 of each stub shaft hub and the central shaft 70 is slidably positioned between the discs so that the grooves or slots 74 and 75 in each end hub engage the projections carried by the adjacent stub shaft hub. To insure proper fit of central shaft 70 between the discs 61 and 62, a spring member 105 is carried on stub shaft 41 and biases the stub shaft hub 47 for axial movement in the journal bearing 43. A lock collar 106 retains the stub shaft in the bearing when the central shaft 70 is removed.

Thus, by utilizing the removable central shaft and associated connecting means of the present invention, a barbecue rotisserie can be quickly and easily removed from the oven compartment and the unobstructed interior of the compartment and the rotisserie elements can be cleaned of contaminating food particles and grease thereon without disconnecting the drive means or removing the support shaft from the journal bearings rotatably supporting the rotisserie elements.

In the drawings and specification there has been set forth a preferred embodiment of the invention and, although specific terms are employed, they are used in a generic and descriptive sense only and not for purposes of limitation, the scope of the invention being defined in the claims.

That which is claimed is:

1. A barbecue device having a housing and a rotisserie comprising first and second spaced apart axially aligned stub shafts rotatably mounted in said housing, a central shaft positioned between said stub shafts and in axial alignment therewith, a pair of spit supporting discs, said discs positioned adjacent each end of said central shaft and the inner end of the associated stub shaft and disposed substantially perpendicularly to the axis of said stub shafts, and means connecting the central shaft to the stub shafts and the discs and permitting removal of the central shaft and the discs from the stub shafts without disturbing the positional arrangement of said stub shafts to facilitate cleaning of the rotisserie, said connecting means including opposing pairs of hubs carried by the ends of said stub shafts and said central shaft, each of said pairs of hubs sandwiching each of said discs therebetween, and means penetrating said pairs of hubs and the disc therebetween to removably secure them together.

2. A barbecue device having a housing and a rotisserie comprising first and second spaced apart axially aligned stub shafts rotatably mounted in said housing, a central shaft positioned between said stub shafts and in axial alignment therewith, a pair of spit supporting discs, said discs positioned adjacent each end of said central shaft and the inner end of the associated stub shaft and disposed substantially perpendicularly to the axis of said stub shafts, and means connecting the central shaft to the stub shafts and the discs and permitting removal of the central shaft and the discs from the stub shafts without disturbing the positional arrangement of said stub shafts to facilitate cleaning of the rotisserie, said connecting means including a hub mounted on the inner end of each of said stub shafts, each stub shaft hub having a pair of spaced projections extending inwardly therefrom and an aperture therein spaced from the projections, each of said supporting discs having apertures therein in alignment with the projections on each of the stub shaft hubs, one of the discs mounted on each stub shaft hub with the projections of the hub extending through the corresponding apertures on the disc, an aperture on each disc in alignment with the aperture on its supporting stub shaft hub, a hub on each end of said central shaft having lateral grooves therein slidably engaging the spaced projections on the stub shaft hubs, an aperture located on each central shaft hub in alignment with the aligned apertures of the adjacent disc and stub shaft hub, and means extending through the thus aligned apertures to secure the corresponding hubs and the supporting discs positioned therebetween together.

References Cited

UNITED STATES PATENTS

| | | | |
|---|---|---|---|
| 862,053 | 7/1907 | Cobb | 15—392 X |
| 1,205,162 | 11/1916 | Clements | 15—392 X |
| 2,478,253 | 8/1949 | Doner | 99—421 X |
| 2,534,166 | 12/1950 | Gierke et al. | |
| 2,722,882 | 11/1955 | Wilson | 99—421 |

FOREIGN PATENTS 853,400  12/1939  France.

WALTER A. SCHEEL, *Primary Examiner.*

JOHN M. NEARY, *Assistant Examiner.*